United States Patent
Doniguian

[15] 3,666,650
[45] May 30, 1972

[54] FLUID SENSOR CAP ASSEMBLY

[72] Inventor: Thaddeus M. Doniguian, Laguna Beach, Calif.

[73] Assignee: I.M.I., Division of Becton, Dickinson and Company, Newport Beach, Calif.

[22] Filed: May 6, 1970

[21] Appl. No.: 35,187

[52] U.S. Cl. ........................................... 204/195 P, 220/39
[51] Int. Cl. ......................................................... G01n 27/30
[58] Field of Search ........................... 220/39; 204/195 P, 1 T

[56] References Cited

UNITED STATES PATENTS

| 3,211,638 | 10/1965 | Halvorsen | 204/195 |
| 3,445,369 | 5/1969 | Porter et al. | 204/195 |
| 3,518,179 | 6/1970 | Bleak et al. | 204/195 |

*Primary Examiner*—G. L. Kaplan
*Attorney*—White, Haefliger and Bachand

[57] ABSTRACT

Membrane type polarographic oxygen sensors are constructed to be uniformly rechargeable with electrolyte by introducing a selected quantity of electrolyte into a tubular cap for reception at the electrode side of a membrane in the cap; the cap is then assembled into the sensor body in such manner as to bring the electrolyte into contact with the cathode tip, and into a predetermined volume space adjacent the tip for current carrying purposes.

3 Claims, 5 Drawing Figures

Patented May 30, 1972

3,666,650

THADDEUS M. DONIGUIAN
INVENTOR.

By
White, Haefliger & Bachand
ATTORNEYS.

FLUID SENSOR CAP ASSEMBLY

BACKGROUND OF THE INVENTION

This invention relates generally to devices for sensing the quantities of substances, such as gas molecules, present in a composition. More specifically it concerns improvements in the recharging of membrane type polarographic oxygen sensors.

Present sensors of the above type must frequently be recharged with electrolyte, a process which necessitates removal and cleaning of multiple components followed by securing of an oxygen passing membrane about a cathode on which fresh electrolyte has been placed. This procedure frequently results in undesired loss of electrolyte from the cathode zone, which reduces the life of the recharged sensor; also it can lead to unwanted error in oxygen concentration readings, and it is time consuming and tedious and requires considerable manual agility.

SUMMARY OF THE INVENTION

It is a major object of the invention to provide apparatus and method characterized as overcoming the above problem stemming with known recharging techniques. Basically, the method of the invention contemplates securing the membrane to a tubular cap prior to its connection onto the sensor body; introduction of a selected quantity of electrolyte into the cap for reception at the electrode side of the membrane; and assembly of the cap onto the sensor body in such manner as to bring the electrolyte into contact with the cathode tip, the assembly also causing introduction of the electrolyte into a space of predetermined volume adjacent the tip for current carrying purposes, unwanted loss of electrolyte from that space being prevented. As a result, uniformity of electrolyte recharging is achieved, and in an expeditious and simple manner.

In its apparatus aspects, the invention contemplates the provision of a cap sized to be assembled over the electrode and onto the sensor body, the cap having a tubular portion to extend about the electrode in spaced relation to the electrode, a membrane attached to the cap to extend across the interior of the tubular portion in such position as to receive displaceable electrolyte to be brought into contact with the electrode tip and into the space between the electrode and cap tubular extent in response to cap assembly onto the sensor body, the membrane characterized as capable of passing a selected gas molecule such as oxygen.

As will appear, the membrane may be secured to the cap bore as by means of a ring providing a stop presented to engage the sensor structure and limit assembly of the cap onto the body when the membrane has desired proximity to the cathode tip, a thin film of electrolyte remaining between that tip and the membrane. Further, the membrane typically projects generally conically free of a shoulder extending about the electrode such as a cathode, thereby to form with the cathode and tubular cap an annular space of predetermined volume into which electrolyte is received in response to the assembly of the cap onto the body structure. That shoulder may with advantage be defined by an insulator surrounding the cathode.

These and other objects and advantages of the invention, as well as the details of an illustrative embodiment, will be more fully understood from the following description and drawings, in which:

DRAWING DESCRIPTION

DETAILED DESCRIPTION

Figure 1:
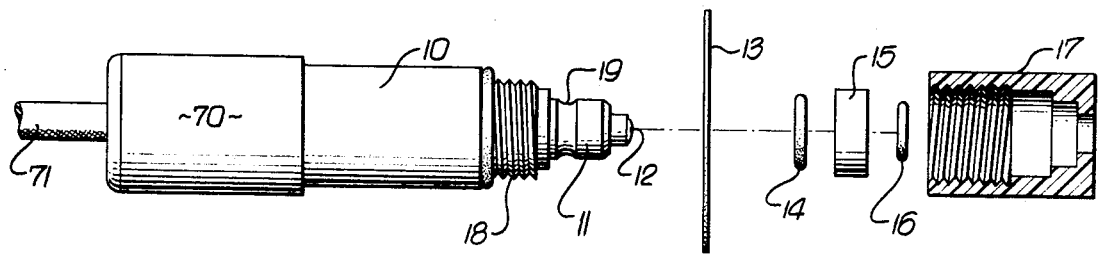
FIG. 1 is an exploded view of a conventional sensor showing the components involved in recharging.

Referring first to FIG. 1, a known membrane type polarographic oxygen sensor is shown in disassembled state to illustrate certain problems that arise upon recharging during usage. That sensor may be as described in U.S. Pat. No. 2,913,386 to Clark, and include a body 10, an anode 11 projecting at the right end of the body, and cathode 12 projecting from the anode. The anode may for example be silver surfaced, and the cathode may consist of a gold rod embedded in a tube 112 of insulative material.

At the right of the cathode in FIG. 1 there are illustrated an oxygen passing membrane 13, which may for example consist of a disc of polyethylene, an O-ring seal 14, a spacer ring 15, a second O-ring 16 and a cap 17. These elements are removed from the body 10 when the cap 17 is unscrewed from the body threads 18, for recharging purposes. The latter process consists of removing and cleaning the cap 17 and elements 14–16. The membrane 13 is discarded and the cathode 12 and anode 11 along with threads 18 are cleaned. Fresh electrolyte in the form of a gel (as for example aqueous potassium chloride solution) is then applied to the cathode and anode, after which a fresh membrane 13 is placed across the cathode, folded into conical shape over the anode shank and secured into the groove 19 on the anode as by means of O-ring 14. The spacer and O-ring 16 are then fitted over the membrane and the cap 17 screwed in place on thread 18.

Even under the most ideal conditions, it is difficult to achieve a long lasting charge, since in the process of securing the O-ring 14 onto the membrane much of the electrolyte is forced out from beneath the membrane. In this regard, insufficient electrolyte corresponds to undesirably reduced life of the charge, "life" referring to the active use time prior to development of electrolyte depolarization producing inaccurate oxygen readings. Also, the disassembly, cleaning and reassembly of the many parts is at best tedious, time consuming, and reassembly does not always result in a uniform or proper recharge, so that the useful life of a given charge will vary considerably, and unpredictably, which can be dangerous during surgery where accurate oxygen monitoring is critical.

Figure 2:
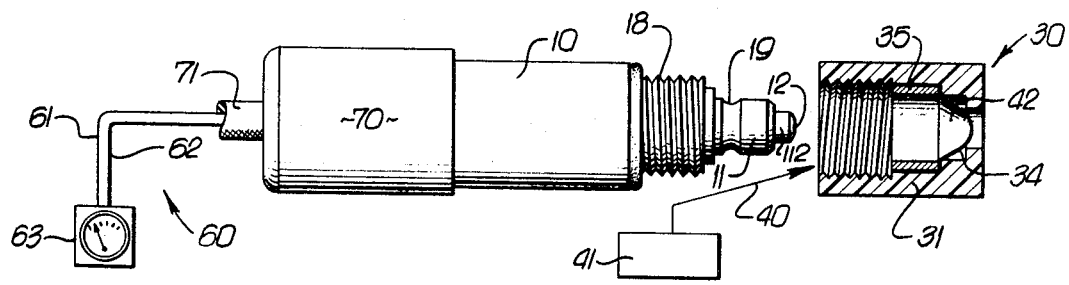
FIG. 2 is an exploded view of a sensor incorporating the invention, and showing components involved in recharging.
Figure 4:
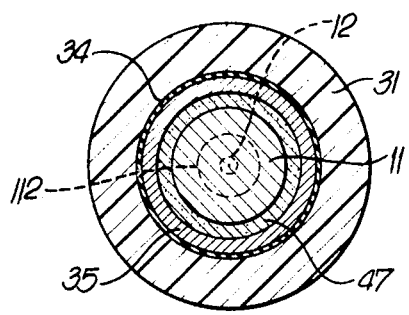
FIG. 4 is a section taken on line 4—4 of FIG. 3.
Figure 3:
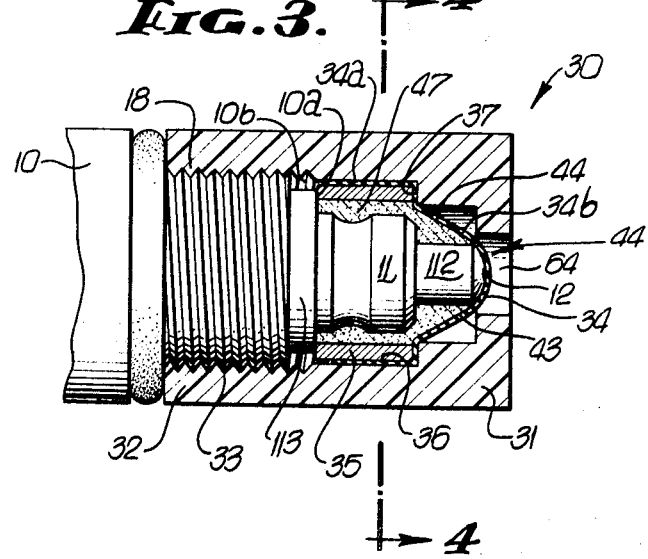
FIG. 3 is an enlarged vertical elevation taken in section to show the FIG. 2 components assembled on the sensor body.

Referring now to FIGS. 2–5, the pre-assembled membrane and cap indicated at 30 overcome the above problems. The tubular cap 31 is sized to be assembled over the electrodes (cathode and anode 12 and 11), with skirt 32 having interior threading 33 screwed onto the body thread 18. An oxygen molecule passing membrane 34 has an outer annular portion 34a secured to the cap, as for example by a ring 35. If desired, the membrane portion 34a may be preliminarily attached to the ring to form a subassembly which is then fitted with some interference into the cap bore 36 and to endwise engage the cap step shoulder 37. When the cap is assembled onto the thread, the opposite "stop" end of the ring 35 may engage the body shoulder 10a to limit the screw-on assembly to predetermine the degree of forcible contact of the tip of electrode (cathode) 12 with the membrane, as seen in FIG. 3.

Prior to such assembly, the anode and cathode are cleaned, and a measured amount of electrolyte is inserted into the new cap assembly as indicated by the arrow 40 in FIG. 2 extending from the electrolyte dispenser 41. Such electrolyte is received through the cap open end into the conical zone 42 formed by the membrane, i.e. for most advantageous contact with the electrodes upon assembly of the cap onto the body, and furthermore for controlled introduction of a predetermined amount of electrolyte into the space 43 between the electrodes to further the objective of charge life predictability.

In this regard, an annular conical shoulder 44 is presented, as for example by insulative material 112, to surround the cathode 12 in spaced relation to the cathode tip 12. During assembly, the membrane 34 urges the electrolyte into contact with the electrode tip and into the spaces 43 as described and space 47 between ring 35 and anode 11, the electrolyte being indicated at 46 in FIG. 5. Spaces 43 and 47 becoming filled with electrolyte upon assembly, any excess is then squeezed past body shoulder 10a and into the outer space 10b about the body part 113. Accordingly, since the electrical current-passing extent of the electrolyte is in spaces 43 and 47, the filled volume of which is controlled by the assembly of the cap to the body, the useful life of the electrolyte is automatically determined with optimum and repeatable uniformity. Also, this larger volume provides adequate anode exposure and quantity of electrode for extended life.

Figure 5:
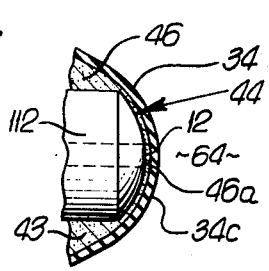
FIG. 5 is an enlarged fragmentary elevation showing the FIG. 3 cathode tip and membrane in assembled relation.

Note that the membrane projects, in FIG. 3, generally conically at 34b free of the tube 112 from an annular locus of engagement or near-engagement with shoulder 44. FIG. 5 indicates that a very thin film 46a of electrolyte remains between the membrane nose and the electrode tip 12 and also between the membrane and the tip of tube 112, despite predetermined forcible stretching of the membrane. Assuming oxygen determination, the electrolyte provides for the flow of ions in electro-reduction and electro-oxidation processes in accordance with the overall equation:

$$2H^+ + O + 2e \rightarrow H_2O$$

where $H^+$ represents a hydrogen ion, O represents an oxygen atom, and $e$ represents an electron. Suitable electrolytes are known in the art. The electrical current carrying capacity of the cell will vary in direct proportion to the quantity of oxygen passing into the electrolyte. FIG. 2 illustrates the use of circuitry 60 operable to apply a given voltage between the anode and cathode leads 61 and 62, and to read at 63 the current flow which varies with the quantity of oxygen passing through the membrane from the side 64 thereof and into the electrolyte film 46a. In this regard, it is contemplated that the invention is usable in other applications to sense other gas molecules.

Additional advantages include the ease of recharging without need for manual agility, the disposability of the caps, the ease of preassembly of the membrane to the cap, and the simplicity of the apparatus and method.

Element 70 in FIGS. 1 and 2 is a rear cap attached to body 10, and from which a cable 71 extends, the cable containing leads 61 and 62.

Circuitry 60 may incorporate suitable temperature compensation, such as a temperature sensitive resistance (i.e. thermistor) used with the cathode 12 so that the temperature of that resistance is the same as that of the fluid being tested at the side 64 of the membrane. Such compensation eliminates the effect of temperature change upon the current flow read at 63.

I claim:

1. For use with sensor structure comprising a body, and electrode means including a projecting electrode carried by the body, the electrode having an exposed blunt tip, the combination comprising a. a cap sized to be assembled over the electrode and onto said body, the cap having a tubular portion to extend about the electrode in spaced relation thereto when said electrode is inserted forwardly through one open end of the cap, and b. a membrane extending across the interior of said tubular portion in such position as to receive displaceable electrolyte at one side of the membrane to be brought into contact with said electrode tip and into the space between said electrode and cap tubular portion in response to said assembly of the cap, the membrane characterized as passing certain gas molecules, there being a ring securing the membrane to the cap bore, a first annular portion of the membrane retained between the ring outer surface and the cap bore, and a second annular portion of the membrane retained between the ring forward terminal and a rearward facing annular step shoulder of the cap, that portion of the membrane extending inwardly of said second portion projecting forwardly of the ring and being openly exposed rearwardly to said one open end of the cap to receive said electrolyte, and to centrally receive application of force transmitted by the electrode tip for predetermined tensioning of the membrane.

2. The combination of claim 1 wherein said membrane is an oxygen passing membrane.

3. The combination of claim 2 including a stop on the ring within the cap presented to engage said sensor structure and limit said assembly of the cap thereto when the membrane is brought into force transmitting relation with the shoulder.

* * * * *